United States Patent

[11] 3,610,371

| [72] | Inventor | Paul Douglas Abbott<br>403 Webster St., Needham, Mass. 02194 |
|---|---|---|
| [21] | Appl. No. | 783,563 |
| [22] | Filed | Dec. 13, 1968 |
| [45] | Patented | Oct. 5, 1971 |

[54] AUXILIARY ELEVATOR CONTROL SYSTEMS
25 Claims, 5 Drawing Figs.

[52] U.S. Cl. ................................................ 187/29 R
[51] Int. Cl. ....................................................... B66b 13/24
[50] Field of Search............................................ 187/29;
322/1, 13; 307/64, 68, 70–75; 290/4, 30;
318/141–143, 149, 440, 442

[56] References Cited
UNITED STATES PATENTS

| 2,000,161 | 5/1935 | Burgett.......................... | 322/1 X |
| 2,606,217 | 8/1952 | Raine et al.................... | 318/141 X |
| 2,701,033 | 2/1955 | Chiselbrook.................. | 187/29 |
| 2,968,364 | 1/1961 | Robertson..................... | 187/29 |
| 3,144,917 | 8/1964 | Tressel......................... | 187/29 |

Primary Examiner—Oris L. Rader
Assistant Examiner—W. E. Duncanson, Jr.
Attorney—W. R. Hulbert ABSTRACT: An auxiliary control system for an elevator installation with safety switches, a brake coil, and a main motor driven from a primary power supply for normal operation of the installation, employs a motor-generator set for driving the armature of the main motor, control circuitry, a transformer-rectifier set for providing a source of electrical current at at least one voltage, and a connector for effectively connecting the source to the brake coil and to the field and armature of the main motor, and for effectively coupling the safety switches to the control circuitry.

AUXILIARY ELEVATOR CONTROL SYSTEMS

This invention relates to emergency elevator control.

Objects of the invention are to provide, upon a power failure, sufficient current to release an elevator brake and to drive an elevator motor with apparatus that operates on a small emergency power supply, safely provides a high degree of control over the elevator, and is inexpensive, compact, reliable, and is quickly and easily installed and operated in a foolproof manner.

In one aspect the invention features an auxiliary control system for an elevator installation for operating the same in the event of deenergization of the primary power supply, The installation has safety switches, a brake coil and a main elevator motor driven by the primary power supply for normal operation of the installation, and the system includes means adapted to be connected to an auxiliary power source for providing an electrical current at at least one voltage, a motor-generator set energized by the current and arranged to supply current to energize the armature circuit of the main motor and control circuitry including means for connecting the electrical current to the brake coil and to the field and armature of the main motor and for effectively coupling the safety switches into the control circuitry.

In preferred embodiments the system also includes switching means for disconnecting the installation from the primary power supply before the electrical current is selectively provided and means for preventing the primary power supply from being reconnected to the installation when the current is selectively provided; the safety switches are connected between the primary power supply and the main motor; the system includes switching means arranged to disconnect the safety switches from the primary power supply when the primary power is deenergized and to reconnect the safety switches between the auxiliary power supply and the main motor. The installation has a door motor connected to the primary power supply and the system includes switching means arranged to disconnect the primary power supply from the door motor when the primary power supply is deenergized and to reconnect the door motor for energization by the current; a first switching means is arranged to be operated to disconnect the installation from the primary power supply before the electrical current is selectively provided and a second switching means is arranged to be operated to disconnect the primary power supply from the safety switches and the door motor when the primary power supply is deenergized, to reconnect the safety switches between the auxiliary power supply and the main motor and to reconnect the door motor for energization by the current; the second switching means is arranged to operate the first switching means when the second switching means is operated; the installation includes a switch, controlled by a relay, in the power line from the primary supply to the main motor, and the first switching means includes a first pair of separately operable switches in series with each other and arranged for operating the relay to open the relay-controlled switch when either of the separately operable switches is opened and the second switching means includes a second pair of separately operable switches, each of the separately operable switches of the second pair being ganged with one of the separately operable switches in the first pair; the means for connecting includes a plurality of female plugs, each having a configuration of receptacles different from the respective configurations in the others and a plurality of male plugs, each having a configuration of prongs different from the respective configurations of the others and being arranged to mate with the receptacles in only one of the female connectors; the ganged switches each have blades disposed behind at least one female connector and have a first position when the ganged switch has been opened, in which they define the means for preventing the system from being connected, the blades obstructing the receptacles to prevent a male plug from mating with the female connector and a second position, when the ganged switch has been opened, in which they are removed from behind the receptacles and cooperate with the prongs of a male plug inserted in the receptacles to define means for preventing reconnecting the primary supply from being reconnected, the prongs preventing the blades from returning to their first position; the system has a first transformer-rectifier set for providing a first source of electrical current at a first voltage, a second transformer-rectifier set for providing a second source of electrical current at a second voltage, a third transformer-rectifier set for providing a third source of electrical current at a third voltage, the third source being effectively connected to the field of the generator in the motor-generator set, and at least one connector for effectively connecting the first source to the brake coil, the second source to the field of the main motor, and the generator to the armature of the main motor and for effectively coupling the safety switches to the control circuit; the connector also effectively connects the third source to the door motor; the control circuitry includes a first control circuit for control of the system, a second control circuit for controlling the direction of elevator movement, and a third control circuit, interposed between the first source and the connector, for controlling the connection of the first source to the brake coil; the connector also effectively connects the third source to the door motor; the control circuitry includes a fourth control circuit interposed between the third source and the connector and the fourth control circuit controls the connection of the third source to the door motor; the first control circuit has first relay operated means arranged to measure the current output of the generator and to prevent the second control circuit from becoming energized to control the direction of elevator movement until the current output of the generator reaches a preset value; the motor-generator set, the transformer-rectifier sets and the control circuits are enclosed in a portable console; the first control circuit includes second relay operated means arranged to measure the field current in the main motor and to render the first control circuit inoperative until the field current reaches a predetermined value, and the first control circuit further comprises third relay operated means arranged to prevent the system from operating until the ganged switches are in their second position and the safety switches are properly positioned for operation.

In another aspect the invention features a method of operating an elevator installation in the event of deenergization of the primary power supply having a normal power rating. The installation includes safety switches, a brake coil and a main elevator motor driven at a first speed by the primary power supply for normal operation of the installation. The method includes the steps of energizing an auxiliary control system, including a motor-generator set for energizing the armature circuit of the main elevator motor and control circuitry, with an auxiliary power supply with a power rating which is of the order of less than one half the normal power rating for providing electrical current at at least one voltage, connecting the control circuitry to the elevator installation to selectively provide the electrical current to the brake coil and to the field and armature of the main motor and to effectively couple the safety switches into the circuitry, so that the main motor is driven under control of the auxiliary system at a speed which is less than the first speed.

In preferred embodiments the installation further includes a switch arranged to be opened for disconnecting the primary power supply from the motor and the method also includes the step of opening the switch before selectively providing the electrical current to the brake coil and the field and armature of the main motor; the connecting includes the step of providing means for preventing the switch from closing when the electrical current is being selectively provided; the auxiliary control system includes at least one transformer-rectifier set arranged to provide the current at at least one voltage and the method includes the step of connecting the auxiliary power supply to the transformer-rectifier set for providing the current at at least one voltage; the installation has a door motor driven from the normal power supply and the method includes the step of connecting the control circuitry to the elevator installation to selectively provide the current to the motor; and the connecting is accomplished at least in part by the step of inserting the prongs on each of a plurality of male plugs into the receptacles of one of a plurality of female plugs, the respective configurations of the receptacles in each of the female plugs being different from the others, and the respective configuration of the prongs on each of the male plugs being different from the others and arranged to correspond to and mate with the receptacles in only one of the female plugs.

Other objects, features, and advantages will appear from the following description of a preferred embodiment of the invention, taken together with the attached drawings thereof, in which.

Figure 1:
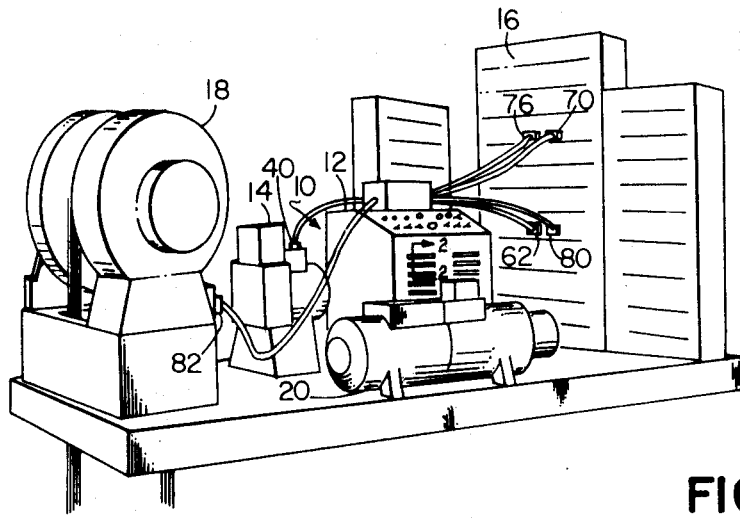
FIG. 1 is an isometric view of the auxiliary control system connected to an emergency power supply and to the elevator controls for emergency operation.

Referring to FIG. 1, the auxiliary control system, generally designated 10, in its portable console 12 is shown connected for emergency operation to available emergency power supply 14, elevator control panel 16, and elevator motor 18 (normally driven by motor-generator set 20, which typically has a 35 to 50 kilowatt output).

Figure 2:
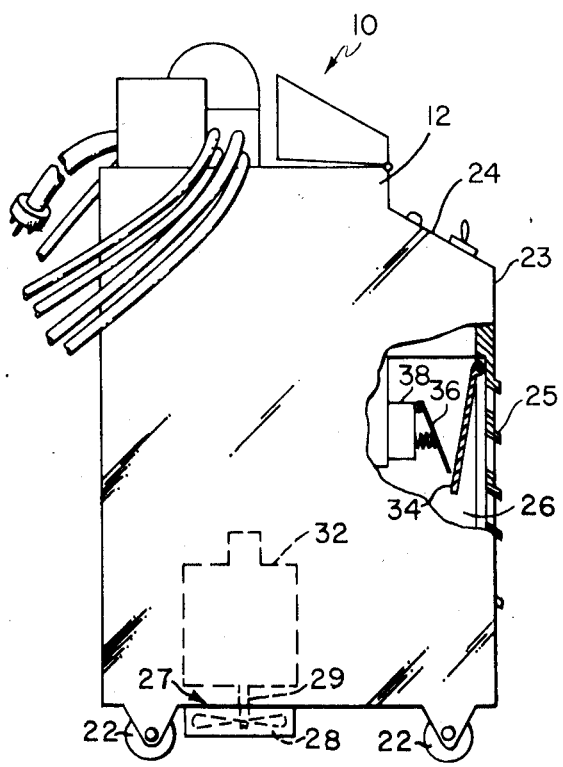
FIG. 2 is a view partly in section and partly broken away taken at line 2—2 of FIG. 1.

Console 12 (FIG. 2) is mounted on wheels 22 and has front panel 23 and control panel 24. Louvres 25 are punched in panel 23 and form an inlet to chamber 26, which has exhaust 27. Fan 28 is rotatably mounted below exhaust 27 on shaft 29, which is connected directly to armature 30 (not shown) of motor-generator set 32 (with a typical 3.5 to 7.5 kilowatt output) in chamber 26. Damper 34 is rotatably mounted behind louvres 25 for contact with spring-baised arm 36 on normally open microswitch 38. Microswitch 38 is in its closed position when arm 36 is in its depressed position.

Control unit 10 (FIG. 3) has male twistlock plug 40 for connection to female connector 42 on available emergency power supply 14 which provides a 208 volt, 60 amp, three-phase supply to directly energize brake transformer 44, starting circuit 46, and transformer-rectifier set 48.

Starting circuit 46 is connected through AC magnetic switch 50 to motor 52 (of auxiliary motor-generator set 32) which drives armature 54 of DC generator 56, through AC magnetic switch 58 to motor field transformer-rectifier set 60, and through AC magnetic switch 62 to brake rectifier 63, the output of which is controlled by brake control circuit 66.

The output of rectifier 60 feeds male plug 62, controller circuit 64, and elevator direction control circuit 68. Leads are provided from controller circuit 64 to male plug 70 for incorporation of existing conventional safety switches 72 (FIG. 4) into circuit 64.

Transformer-rectifier set 48 supplies door motor control switch 74, the output of which is fed to male plug 76 and, when direction control switch 68 is operated, set 48 energizes field 78 of generator 56, the output of which is wired to male plug 80.

Brake control circuit 66 is wired to male plug 82 and when direction control circuit 68 is operated, provides sufficient current to lift the elevator brake.

Figure 3:
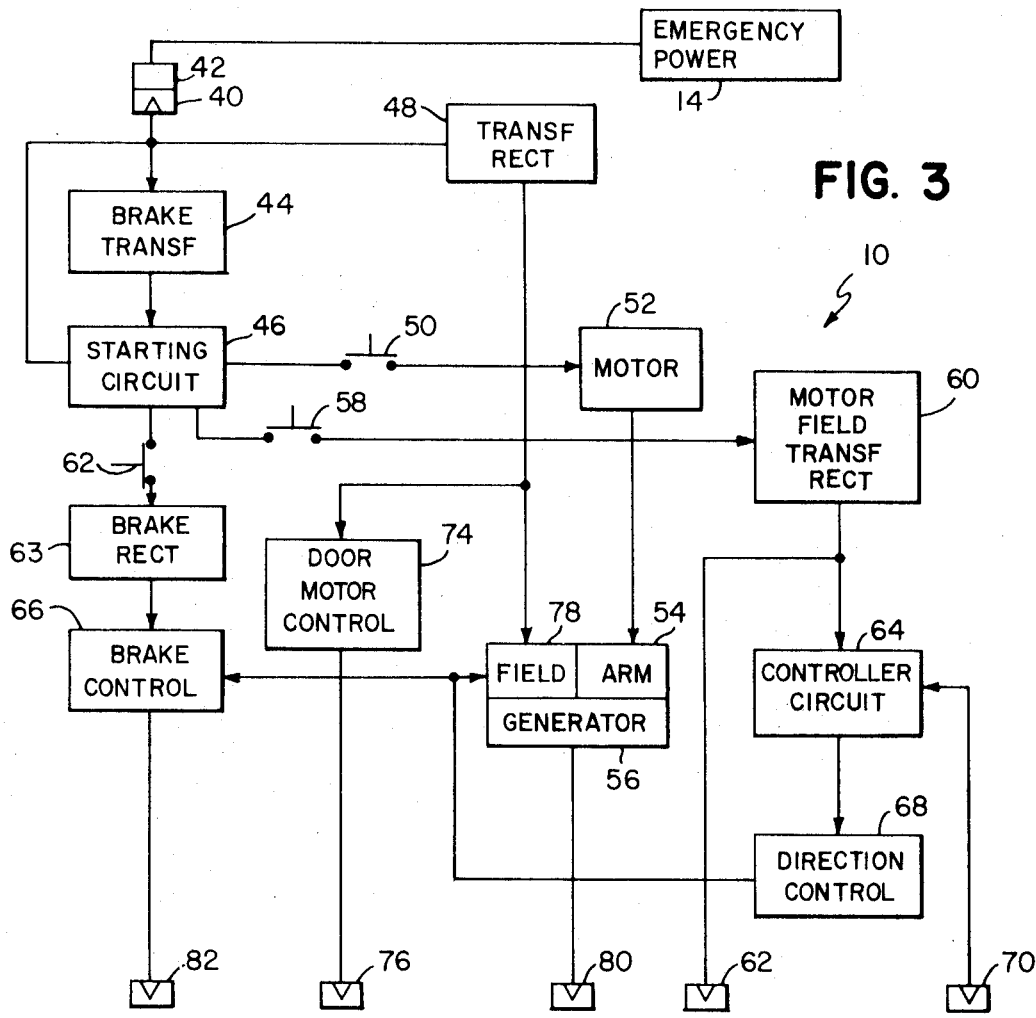
FIG. 3 is a block diagram of the auxiliary elevator control system.
Figure 5:
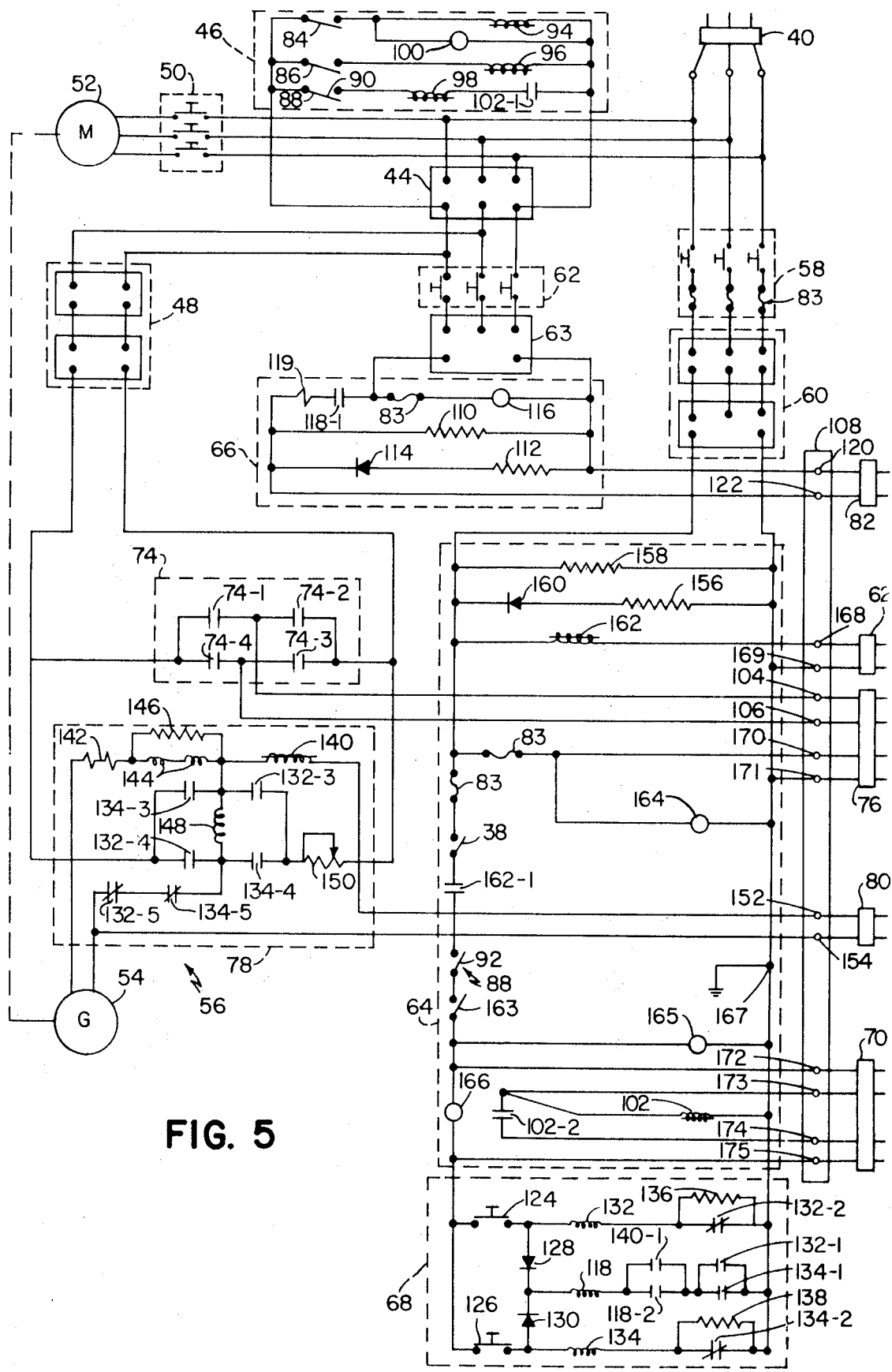
FIG. 5 is a schematic wiring diagram of the auxiliary control system shown diagrammatically in FIG. 3.

The detailed electrical circuitry corresponding to the block diagram of FIG. 3 is shown in FIG. 5. Safety fuses 83 are provided as shown. Starting circuit 46 includes manual switches 84, 86 and 88 (which has ganged blades 90 and 92 in circuits 46 and 64, respectively) coils 94, 96 and 98 (for closing AC switches 50, 58 and 62, respectively), indicating light 100, and normally open contact pair 102-1 (on potential relay coil 102 in circuit 64) connected as shown.

Double pole, double throw, three position door motor control switch 74 has four pairs of normally open contacts 74-1, -2, -3, -4, connected as shown. Contact pairs 74-1 and 74-3 are closed when switch 74 is in the "DOOR OPEN" position and pairs 74-2 and 74-4 are closed when switch 74 is in the "DOOR CLOSE" position.

Leads are wired as shown from door motor control switch 74 to terminals 104 and 106 on terminal block 108.

Brake control circuit 66 has resistors 110 and 112, diode 114, indicating light 116, and normally open contact pair 118-1 (on magnetic brake relay 118 in direction control circuit 68) with blowout 119 connected as shown with leads wired to terminals 120 and 122 on terminal block 108.

Direction control circuit 68 has "UP" pushbutton 124, "DOWN" pushbutton 126, diodes 128 and 130, "UP" relay coil 132 (and its normally open contact pair 132-1 and normally closed contact pair 132-2), "DOWN" relay coil 134 (and its normally open contact pair 134-1 and normally closed contact pair 134-1), relay coil 118 (and its normally open contact pair 118-2), 1000 ohm resistors 136 and 138, and normally open contact pair 140-1 (on current testing relay 140 in generator field circuit 78) connected as shown.

Generator field circuit 78 has interpole field winding 142, series field windings 144 (with shunt 146), shunt field windings 148, relay 140, speed control potentiometer 150 with manual control 151 (not shown), normally open contact pairs 132-3, -4, and 134-3, -4, and normally closed contact pairs 132-5 and 134-5 connected as shown with leads wired to terminals 152 and 154 on terminal block 108.

Controller circuit 64 has 5 ohm resistor 156, 250 ohm resistor 158, diode 160, field current relay coil 162 and its normally open contact pair 162-1, microswitch 38, blade 92 of switch 88, controller switch 163, relay coil 102 and its normally open contact pair 102-2, indicating lights 164, 165, and 166, and ground 167 connected as shown with leads wired to terminals 168, 169, 170, 171, 172, 173, 174 and 175.

Terminals 120 and 122 are wired to male plug 82. Terminals 168 and 169 wired to male plug 62. Terminals 104, 106, 170 and 171 are wired to male plug 76. Terminals 152 and 154 are wired to male plug 80, and terminals 172, 173, 174 and 175 are wired to male plug 70. Terminals 172, 173, 174 and 175 also are wired to panel 24 for testing (described below). Each of male plugs 40, 62, 70, 76, 80 and 82 has a different prong configuration corresponding to the configuration of the receptacles in its respective female connector (described below) so that there is no possibility of improper connection during the installation of system 10.

Switches 74, 84, 86, 88 and 163, pushbuttons 124 and 126, manual control 151, and indicating lights 100, 116, 164, 165 and 166 are mounted on panel 24.

Figure 4:
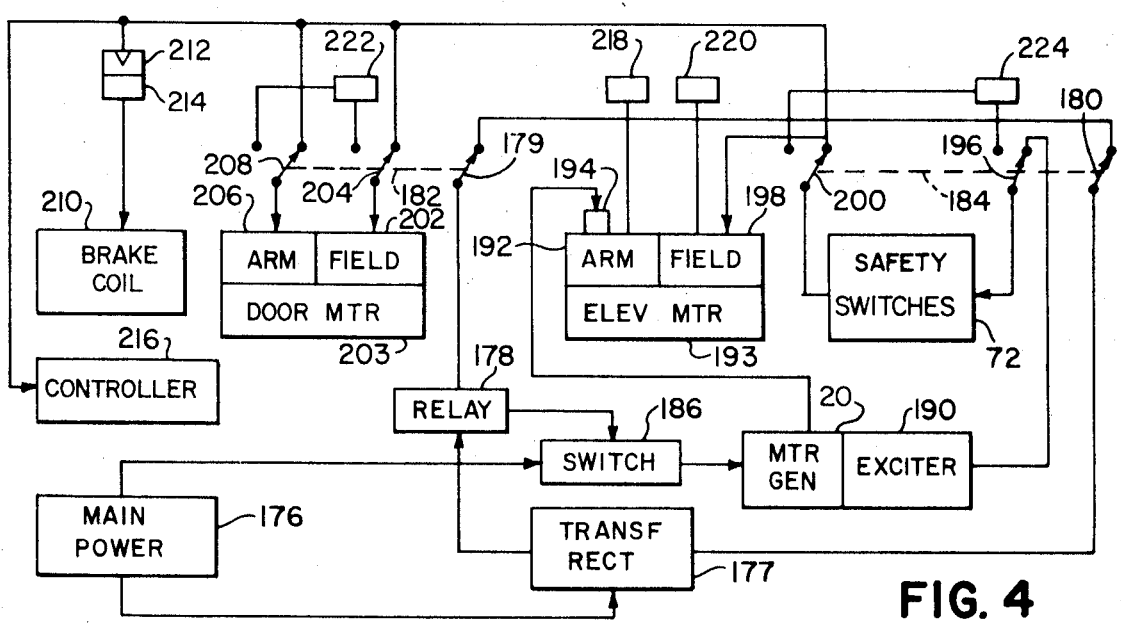
FIG. 4 is a block diagram of the existing elevator system as modified in accordance with the invention, showing switches and connectors for converting from normal to emergency operation of the elevator control system.

Referring to the permanent elevator installation shown in FIG. 4 in the position for normal operation, main power supply 176 is connected to transformer-rectifier 177 to energize initiating relay 178 through blades 179 and 180 in series, respectively, on six pole, three position, ganged blade switches 182 and 184. Relay 178 when energized, holds switch 186, through which main power 172 drives motor-generator set 20 and exciter 190, in its closed position. Motor-generator set 20 drives armature 192 on elevator motor 193 under the control of microswitch 194 which is held in its closed position against the force of a spring by the terminal lug of a lead bolted to the armature. Microswitch 194 is connected into a suitable circuit such as the coils of the starting switches of armature 192 and is arranged to render main motor armature 192 inoperative from the power supply when the terminal lug of one lead bolted to the armature is removed and microswitch 194 is placed in its open position by the force of the spring.

Exciter 190 is connected to elevator Safety switches 72 through blade pair 196 of switch 184. Safety switches 72 are in turn connected to main motor field 198 through blade pair 200 of switch 184, to field 202 in door motor 203 through blade pair 204 of switch 182, to elevator door motor armature 206 through blade pair 208 of switch 182, to brake coil 210 through male plug 212 and female connector 214, and to controller 216.

Elevator motor armature 192 and field 198 are provided with female connectors 218 and 220, respectively, for auxiliary power supply. Female connector 222 is provided for connection of door motor armature 206 and field 202 to blade pairs 208 and 204, respectively, when switch 182 is in the "EMERGENCY" position. Female connector 224 is provided for connection to blade pairs 196 and 200 when switch 184 is in the "EMERGENCY" position. When switches 182 and 184 are in the "NORMAL" position, their respective blades obstruct the receptacles in connectors 222 and 224 so that no plugs may be inserted therein while the elevator circuits are positioned for control by main power 176. When switches 182 and 184 are in the "EMERGENCY" position and male plugs have been inserted in connectors 222 and 224, the prongs on the plugs hold the blades in place and prevent the return of switches 182 and 184 to the "NORMAL" position.

In operation when there has been a failure in main power 176, unit 10 is wheeled into position near panel 16 and plug 40 is connected to emergency power 14 through connector 42.

Switches 182 and 184 are moved to the "EMERGENCY" position. Blades 179 and 180 are open, current flow through relay 178 terminates, and switch 186 opens, disconnecting motor-generator 20 from main power 176. Simultaneously, blade pairs 204 and 208 transfer the power input leads for door motor field 202 and armature 206, respectively to connector 222 and blades pairs 196 and 200 transfer the input leads for safety switches 72 to connector 224.

One lead to armature 192 is manually disconnected, and microswitch 194 opens, disconnecting armature 192 from motor generator 20. Plug 212 is removed from connector 214 and plugs 82, 76, 80, 62, and 70 and inserted in connectors 214, 222, 218, 220, and 224, respectively.

Switch 84 is closed, energizing light 100 and coil 94, which closes switch 50 to start motor 52 and generator armature 54. If rotation of armature 54 is in the proper direction, fan 28 pulls air into louvres 25. The flow of air forces damper 34 to swing in the clockwise direction and to depress arm 36, closing microswitch 38.

Switch 86 is closed, energizing coil 96 which closes switch 58 to energize transformer-rectifier set 60 and light 164. If safety switches 72 are connected properly, potential switch 102 is energized and closes contact pairs 102-1 and 102-2. Current is flowing through coil 162 and, when the elevator motor field current reaches 90 percent of its full load value, coil 162 becomes energized and closes contact pair 162-1.

Switch 88 is closed, energizing coil 98 which closes switch 62 energizing brake rectifier 63 and light 116.

Switch 74 is placed in the "DOOR CLOSE" position, closing contacts pairs 74-1 and 74-3 and energizing field 202 to drive door motor 203, which closes the elevator door or holds it in the closed position.

Controller switch 163 is closed, energizing light 165.

To move the elevator in the upward direction, "UP" button 124 is depressed, energizing relay 132, which closes contact pairs 132-1, -3, -4 and opens contact pairs 132-2, -5, energizing field 78 of generator 56. Current flow through relay coil 140 begins and, when the current in armature 206 reaches a predetermined value, depending upon the particular elevator installation, becomes energized and closes contact pair 140-1, energizing relay coil 118, which closes contact pairs 118-1 and 118-2. When contact pair 118-2 closes, brake coil 210 is energized and lifts the elevator brake, permitting motor 193 to move the elevator. The closing of contact pair 118-2 when relay 118 is energized prevents the brake from setting when armature current is zero instantaneously during elevator movement.

For downward operation, "DOWN" button 126 is depressed, energizing relay 134, which closes contact pairs 134-1, -3, -4 and opens contact pairs 134-2, -5 energizing field 78 of generator 56 with a voltage of the opposite polarity from that for upward movement. Operation of relays 118 and 140 and their respective contact pairs to lift the brake is the same as described above.

Elevator speed is controlled by the setting of control 151 on potentiometer 150. Unit 10 is capable of driving an elevator at speeds of approximately 40 to 50 feet per minute. Elevator location is determined (by visual observation, observation of the existing selector floor bar and/or pie plate, or by automatic stopping at either hoistway terminal, if hoistway limits are inherent in the elevator installation and connected to system 10) as the elevator is raised or lowered to the desired floor. The elevator and hoistway doors are then opened by placing switch 74 in the "DOOR OPEN" position to close contact pair 74-2 and 74-4 so that door motor field 202 is energized with a voltage of the opposite polarity from that for closing the door.

If the safety switches are not positioned for operation (i.e., present an open circuit to the applied voltage), potential relay 102 will not be energized to close contact pairs 102-1, -2, when pushbuttons 124 and 126 are depressed, the brake will not lift and test indicating light 166 is energized. A separate indicator may be placed across terminals 172 and 173 or 174 and 175 to determine whether the trouble lies in the door position circuits or the safety circuits so that the operator may correct the faulty condition.

Control system 10 may be used to continue to operate the same elevator or be disconnected (by reversing the procedures for connection described above) and moved to operate another elevator. After the male plugs have been disconnected, the armature lead formerly removed and plug 214 are reconnected, and switches 182 and 184 returned to the "NORMAL" position so that the elevator will operate when main power 176 is restored.

The sequence of operation for other elevators in the bank is the same as that described above.

Other embodiments will occur to those skilled in the art and are within the following claims.

What is claimed is:

1. An auxiliary control system for an elevator installation for operating the same in the event of deenergization of the primary power supply, said installation having safety switches, a brake coil, and a main elevator motor driven by said primary power supply for normal operation of said installation, said system comprising means adapted to be connected to an auxiliary power source for providing an electrical current at at least one voltage, a motor-generator set energized by said current and arranged to supply current to energize the armature circuit of said main motor, and control circuitry including means for connecting said electrical current to said brake coil and to the field and armature of said main motor and for effectively coupling said safety switches into said circuitry.

2. Apparatus according to claim 1 further comprising switching means arranged to disconnect said installation from said primary power supply before said electrical current is selectively provided and means for preventing said primary power supply from being reconnected to said installation when said current is selectively provided.

3. Apparatus according to claim 1, said system further comprising means for preventing said system from being connected to said installation when said primary power supply is connected to said installation.

4. Apparatus according to claim 1 wherein said safety switches are connected between said primary power supply and said main motor, said system further comprising switching means arranged to disconnect said safety switches from said primary power supply when said primary power is deenergized and to reconnect said safety switches between said auxiliary power supply and said motor.

5. Apparatus according to claim 1 wherein said installation further comprises a door motor connected to said primary power supply, said system further comprising switching means arranged to disconnect said primary power supply from said door motor when said primary power supply is deenergized and to reconnect said door motor for energization by said current.

6. Apparatus according to claim 1 wherein said safety switches are connected between said primary power supply and said main motor and said installation further comprises
- a door motor connected to said primary power supply for normal operation,
- and first switching means arranged to be operated to disconnect said installation from said primary power supply before said electrical current is selectively provided and means for preventing said primary power supply from being reconnected to said installation when said current is selectively provided, said system further comprising
- second switching means arranged to be operated to disconnect said primary power supply from said safety switches and said door motor when said primary power supply is deenergized, to reconnect said safety switches between said auxiliary power supply and said main motor and to reconnect said door motor for energization by said current.

7. Apparatus according to claim 6 wherein said second switching means is arranged to operate said first switching means when said second switching means is operated.

8. Apparatus according to claim 7 wherein said installation further comprises a switch controlled by a relay, said switch being in the powerline from said primary supply to said main motor,
- said first switching means comprising a first pair of separately operable switches in series with each other and arranged for operating said relay to open said relay-controlled switch when either of said separately operable switches is opened, and
- said second switching means comprising a second pair of separately operable switches, each of separately operable switches of said second pair being ganged with one of said separately operable switches in said first pair.

9. Apparatus according to claim 8 wherein said means for connecting comprises
- a plurality of female plugs, each having a configuration of receptacles different from the respective configurations in the others and
- a plurality of male plugs, each having a configuration of prongs different from the respective configurations of the others and being arranged to mate with the receptacles in only one of said female connectors.

10. Apparatus according to claim 9 wherein said system further comprises means for preventing said system from being connected to said installation when said primary power supply is connected to said installation.

11. Apparatus according to claim 10 wherein said ganged switches each have blades disposed behind at least one female connector,
- a first position when said ganged switch has not been opened, in which they define said means for preventing said system from being connected, said blades obstructing said receptacles to prevent a male plug from mating with said female connector and
- a second position, when said ganged switch has been opened, in which they are removed from behind said receptacles and cooperate with the prongs of a male plug inserted in said receptacles to define said means for preventing reconnecting said primary supply from being reconnected, said prongs preventing said blades from returning to their first position.

12. Apparatus according to claim 1 wherein said system has
- a first transformer-rectifier set for providing a first source of electrical current at a first voltage,
- a second transformer-rectifier set for providing a second source of electrical current at a second voltage,
- a third transformer-rectifier set for providing a third source of electrical current at a third voltage, said third source being effectively connected to the field of the generator in said motor-generator set, and
- at least one connector for effectively connecting said first source to said brake coil, said second source to said field of said main motor, and said generator to said armature of said main motor, and for effectively coupling said safety switches to said control circuit.

13. Apparatus according to claim 12 wherein said installation further comprises a door motor driven from said power supply for normal operation and said connector also effectively connects said third source to said door motor.

14. Apparatus according to claim 12 wherein said control circuitry comprises
- a first control circuit for control of said system,
- a second control circuit for controlling the direction of elevator movement, and
- a third control circuit, interposed between said first source and said connector, for controlling the connection of said first source to said brake coil.

15. Apparatus according to claim 14 wherein said installation further comprises a door motor driven from said power supply for normal operation and said connector also effectively connects said third source to said door motor,
- said control circuitry further comprising a fourth control circuit interposed between said third source and said connector,
- said fourth control circuit controlling the connection of said third source to said door motor.

16. Apparatus according to claim 14 wherein said first control circuit has first relay operated means arranged to measure the current output of said generator and to prevent said second control circuit from becoming energized to control said direction of elevator movement until said current output of said generator reaches a preset value.

17. Apparatus according to claim 14 wherein said motor-generator set, said transformer-rectifier sets and said control circuits are enclosed in a portable console.

18. Apparatus according to claim 16 wherein said first control circuit further comprises second relay operated means arranged to measure the field current in said main motor and to render said first control circuit inoperative until said field current reaches predetermined value.

19. Apparatus according to claim 18 wherein said first control circuit further comprises third relay operated means arranged to prevent said system from operating until said ganged switches are in their second position and said safety switches are properly positioned for operation.

20. A method of operating an elevator installation in the event of deenergization of the primary power supply having a normal power rating, said installation having safety switches, a brake coil and a main elevator motor driven at a first speed by said primary power supply for normal operation of said installation, said method comprising the steps of:
- energizing an auxiliary control system with an auxiliary power supply, said auxiliary power supply having a power rating which is of the order of less than one half said normal power rating, for providing electrical current at at least one voltage, said control system having a motor-generator set for energizing the armature circuit of said main elevator motor and control circuitry,
- connecting said control circuitry to said elevator installation to selectively provide said electrical current to said brake coil and to the field and armature of said main motor and to effectively couple said safety switches into said circuitry, so that
- said main motor is driven under control of said auxiliary system at a speed which is less than said first speed.

21. A method according to claim 20 wherein said installation further comprises a switch arranged to be opened for disconnecting said primary power supply from said motor, said method further comprising the step of opening said switch before selectively providing said electrical current to said brake coil and said field and armature of said main motor.

22. A method according to claim 21 wherein said connecting includes the step of providing means for preventing said switch from closing when said electrical current is being selectively provided.

23. A method according to claim 22, said auxiliary control system further comprising at least one transformer-rectifier set arranged to provide said current at at least one voltage, said method further comprising the step of connecting said auxiliary power supply to said transformer-rectifier set for providing said current at at least one voltage.

24. A method according to claim 23, said installation further comprising a door motor driven from said normal power supply and said method further comprising the step of connecting said control circuitry to said elevator installation to selectively provide said current to said door motor.

25. The method of claim 24 wherein said connecting is accomplished at least in part by the step of inserting the prongs on each of a plurality of male plugs into the receptacles of one of a plurality of female plugs, the respective configurations of the receptacles in each of said female plugs being different from the others, and the respective configuration of the prongs on each of said male plugs being different from the others and arranged to correspond to and mate with the receptacles in only one of said female plugs.

UNITED STATES PATENT OFFICE
CERTIFICATE OF CORRECTION

Patent No. 3,610,371      Dated October 5, 1971

Inventor(s) Paul Douglas Abbott

It is certified that error appears in the above-identified patent and that said Letters Patent are hereby corrected as shown below:

Column 1, line 70, after the word "has" insert the word --not--;

Column 4, line 19, "134-1" should read --134-2--;

Column 4, line 38, after the number "169" insert the word --are--;

Column 5, line 32, the word "and" (third occurrence) should be --are--;

Column 6, line 68, before the word "motor" insert the word --main--; and

Column 8, line 39, before the word "predetermined" insert the word --a--.

The above-cited errors were made by the Patent Office in printing the patent.

Signed and sealed this 28th day of March 1972.

(SEAL)
Attest:

EDWARD M. FLETCHER, JR.
Attesting Officer

ROBERT GOTTSCHALK
Commissioner of Patents